Sept. 7, 1965     M. J. PRUCHA     3,205,352
PRESENCE DETECTOR
Filed Aug. 4, 1961     3 Sheets-Sheet 1
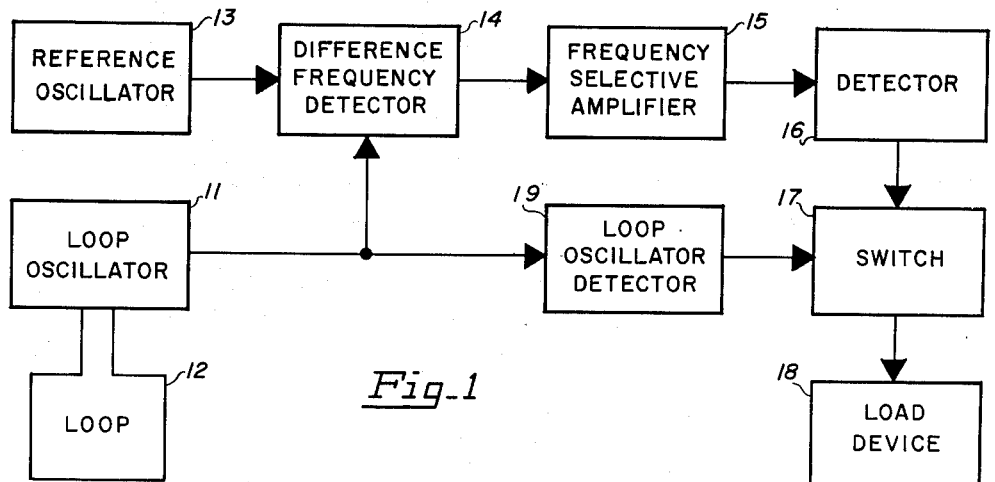
Fig. 1
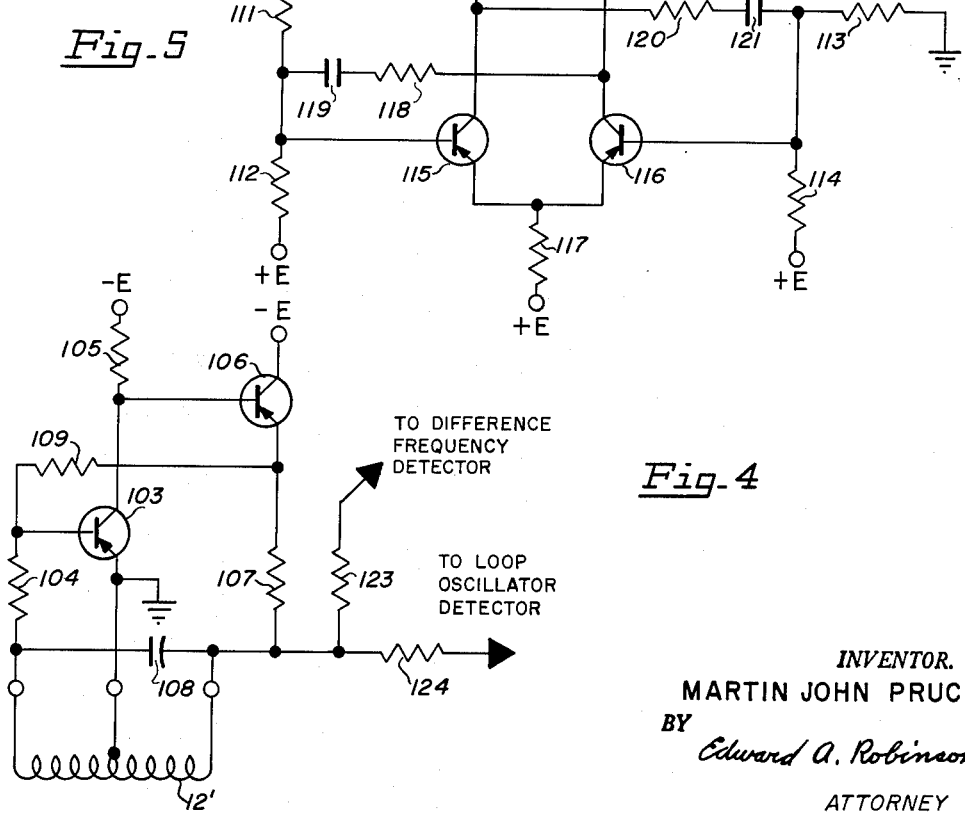
Fig. 5
Fig. 4
INVENTOR.
MARTIN JOHN PRUCHA
BY
Edward A. Robinson
ATTORNEY

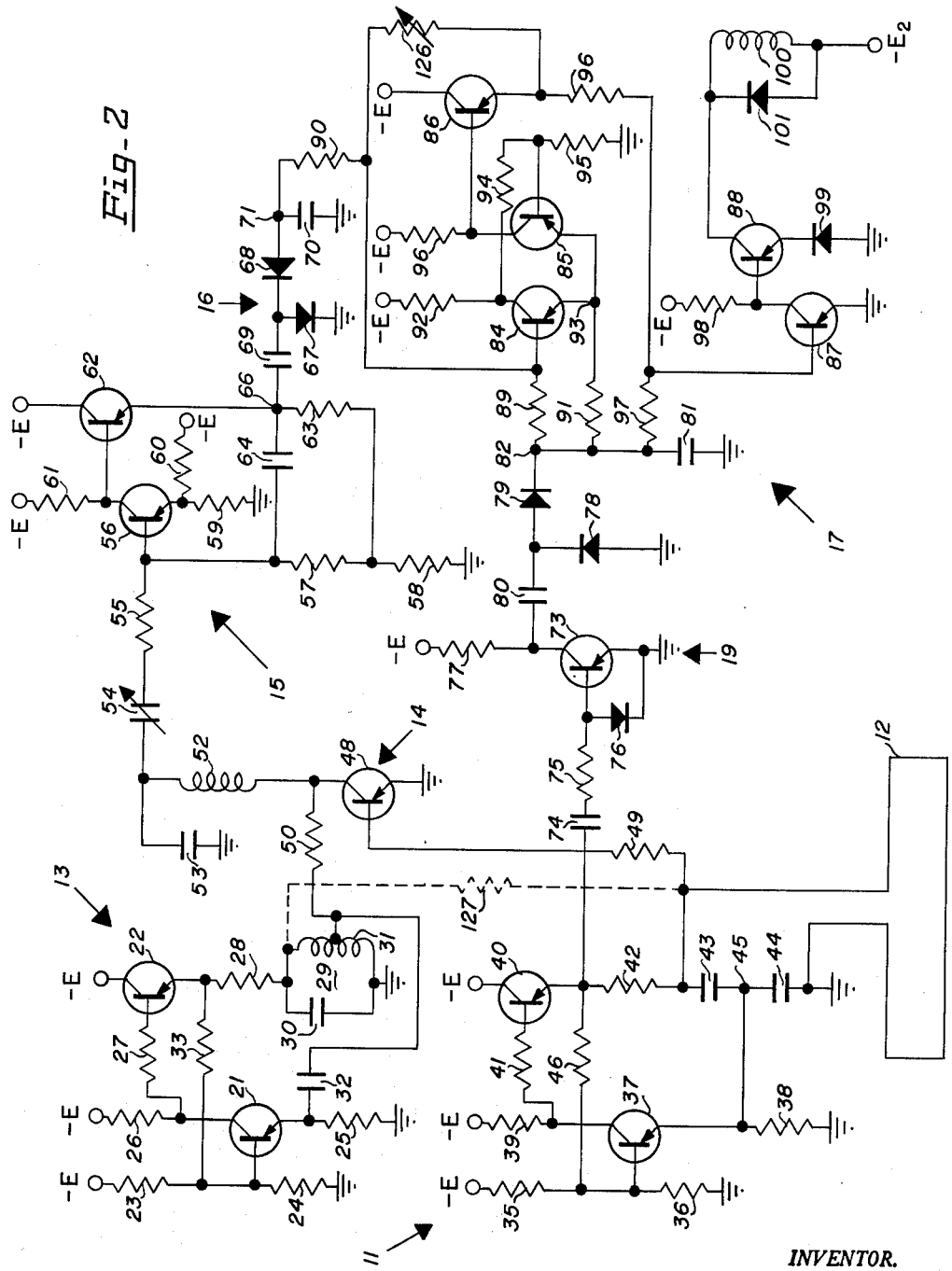

United States Patent Office 3,205,352
Patented Sept. 7, 1965

3,205,352
PRESENCE DETECTOR
Martin John Prucha, Palo Alto, Calif., assignor to General Precision, Inc., Binghamton, N.Y., a corporation of Delaware
Filed Aug. 4, 1961, Ser. No. 129,342
12 Claims. (Cl. 246—30)

This invention relates to circuits for sensing the presence of a metallic mass such as a motor vehicle or railroad vehicle, and more particularly, this invention relates to such circuits wherein an inductive loop generates a magnetic field and wherein the inductance value of the loop is affected by the introduction of a metallic mass into the magnetic field.

This invention provides improved circuits for a presence detector system disclosed and claimed in a patent application, Serial No. 95,236, entitled "Inductive Loop Presence Detector," filed by Robert A. Kleist and John Scarbrough on March 13, 1961, and assigned to the same assignee as the instant application, now Patent No. 3,164,802. This co-pending patent application discloses an arrangement for sensing vehicles by the use of an inductive loop over which a vehicle may pass. The loop is electrically connected as a part of an oscillator circuit wherein the inductance value of the loop determines the frequency of oscillation. The frequency of the loop oscillator may be compared with the frequency of a reference oscillator to obtain a difference or beat frequency which will vary widely when the frequency of the loop oscillator shifts somewhat due to the presence of a metallic mass in the magnetic field of the loop.

It is an object of this invention to provide an improved circuit for sensing the presence of a metallic mass, and more particularly, it is an object to provide such a circuit which may operate a railroad signal or crossing gate or the like and will include a "fail safe" arrangement whereby malfunction and failure of the circuit to oscillate will cause a switching action to operate the signal and to eliminate the possibility of a hazardous situation which may otherwise occur through total lack of signal operation.

A further object of this invention is to provide an improved inductive loop presence detector which will not operate until a substantial proportion of a metal mass such as a vehicle moves into the field of a loop, but wherein the circuit once operated will be partially self-sustaining and will be held by a lesser proportion of the vehicle remaining in the field of the loop; and more particularly, it is an object to provide a one-way traffic gate which may be operated by the approach of a vehicle from one direction but not from the other.

Another object of this invention is to provide an improved loop arrangement for sensing railroad cars and the like, and more particularly, it is an object to provide an inductive loop positioned between the rails of a track and sensitive to variation in inductive values which may be created in part by conductive paths formed across the rails by the wheels and axles of the cars to create a short circuited loop which is magnetically coupled to the inductive loop of the presence detector apparatus.

Numerous other objects and advantages will be apparent throughout the progress of the specification which follows. The accompanying drawings illustrate certain selected embodiments of the invention and the views therein are as follows:

FIGURE 1 is a schematic block diagram of an inductive loop metal mass detector constructed in accordance with the teachings of this invention;

FIGURE 2 is a complete circuit diagram of the inductive loop metal mass detector circuits shown as blocks in FIGURE 1;

FIGURE 3 is a graphical representation of the characteristics of a frequency sensitive amplifier shown in FIGURES 1 and 2;

FIGURE 4 is a schematic diagram of a loop oscillator circuit which may be used as an alternative to the oscillator circuit shown in FIGURE 2;

FIGURE 5 is another alternative oscillator circuit which may be used in this invention;

FIGURE 6 is a plan view of a loop arrangement which may be used to control one-way vehicular traffic past an unattended gate;

FIGURE 7 is a plan view of an inductive loop which may be positioned between the rails of a railroad track.

Briefly stated, and with reference to FIGURE 1, this invention includes a first oscillator 11 having an inductive loop 12, and a second oscillator 13 for generating a reference frequency. A beat frequency detector circuit 14 receives signals from both of the oscillators 11 and 13 and generates a signal equal to the difference between the frequencies of the oscillators. Ordinarily, the frequency of the loop oscillator 11 is substantially equal to the reference frequency of the oscillator 13, and therefore, no appreciable difference signal will be generated by the circuit 14. However, when a vehicle or other metal mass moves into the magnetic field of the loop 12 the frequency of the loop oscillator 11 increases, and the beat frequency oscillator 14 will generate an audio signal corresponding to the difference between the frequencies of the oscillators 11 and 13. A selective amplifier 15 will respond to the audio signal thus generated and will pass a signal of increased level to a detector or rectifier circuit 16. A transistor switch circuit 17 will receive the direct voltage level from the circuit 16 and effectively energize an actuation or output device 18 coupled thereto. Another detector or rectifier circuit 19 is coupled directly to the loop oscillator 11 and will furnish a direct potential level to the switch circuit 17 whenever the oscillator 11 is functioning properly. In the event of malfunctioning and failure of the oscillator 11, the direct potential level from the detector 19 will be interrupted and will cause operation of the switch circuit 17 and of the actuation device 18.

The reference oscillator need not be a constant frequency crystal oscillator, and various types of oscillators could be used. In the circuit of FIGURE 2, the oscillator 13 comprises a pair of transistors 21 and 22. The base electrode of the first transistor 21 is connected between a pair of resistors 23 and 24 constituting a potential dividing network for providing a negative bias. The emitter electrode is coupled to ground potential via a resistor 25, and the collector electrode is coupled to a negative reference potential, —E, via a load resistor 26. The base electrode of the second transistor 22 is coupled to the collector electrode of the transistor 21 via a resistor 27. The transistor 22 is connected as an emitter follower with the collector electrode directly connected to the negative reference potential, and the emitter electrode coupled to ground by a resistor 28 and a tuned circuit 29 including a capacitor 30 connected in parallel with an inductive winding 31. A capacitor 32 is provided as a positive feedback path from a center-tapped connection of the winding 31 and the emitter electrode of the transistor 21. The tuned circuit 29 effectively controls the frequency of oscillation of the reference oscillator 13. A resistor 33 may be included to provide a negative feedback path for stabilizing the gain of the circuit 13, although this circuit can function without this resistor 33.

The circuit of the loop oscillator 11 is similar to the circuit of the reference oscillator 13. A pair of serially connected resistors 35 and 36 provide a negative bias to a first transistor 37. The emitter electrode of the transistor 37 is coupled to ground potential by a resistor 38, and the collector electrode thereof is coupled to the negative reference potential by another resistor 39. A second transistor 40 coupled as an emitter follower with the collector electrode directly connected to the negative reference voltage and the base electrode coupled to the transistor 37 via a resistor 41. The emitter electrode of the transistor 40 is coupled to ground by a resistor 42 and a tuned circuit which includes a pair of serially connected capacitors 43 and 44 and the loop 12 which in this case constitutes the inductive winding. The series connection point 45 between the capacitors 43 and 44 is connected to the emitter electrode of the transistor 37 to provide positive feedback for the oscillator. A resistor 46 may be connected between the emitter electrode of the transistor 40 and the base electrode of the transistor 37 to provide a negative feedback for gain stabilization.

The beat frequency detector circuit 14 includes a transistor 48 having a base electrode coupled to the oscillator 11 by a resistor 49 and having a collector electrode coupled to the oscillator 13 by a resistor 50. If the frequencies of the oscillators 11 and 13 are equal to each other, the transistor 48 may generate a direct voltage which may be positive or negative depending upon the relative phase of the two input frequencies, but this direct voltage will not affect the amplifier 15 because of a capacitive coupling thereto. If the frequencies of the oscillators 11 and 13 differ, the output voltage from the transistor 48 will vary at a rate corresponding to the difference between the oscillator frequencies, and this difference signal will be passed to the amplifier 15.

An inductive winding 52 and a capacitor 53 comprise a low pass filter which attenuates the radio frequency currents generated by the oscillators 11 and 13, but this filter 52–53 will pass the audio frequencies from the detector 14.

A capacitor 54 and a resister 55 provide a coupling between the beat frequency detector 14 and the selective amplifier 15. The amplifier 15 includes a first transistor 56 having a base electrode coupled to ground via resistors 57 and 58. The emitter electrode of the transistor 56 is connected between a pair of resistors 59 and 60 constituting a potential dividing network for providing a fixed bias. The collector electrode of the transistor 56 is coupled to the negative reference potential by a load resistor 61 and is directly coupled to the base electrode of a second transistor 62. Second transistor 62 constituting an emitter follower includes a collector electrode directly connected to the negative reference voltage and an emitter electrode coupled to ground reference potential by a resistor 63 and the resistor 58. The resistance network including resistors 57, 58 and 63 provide a stabilizing negative feedback between the transistors 62 and 56. A capacitor 64 having a relatively small value also provides negative feedback which is selective of the higher frequency signals, and therefore, the capacitor 64 still further attenuates the radio frequency signals of the oscillators 11 and 13 which were principally filtered out by the low pass filter 52–53.

As indicated in FIGURE 2, the capacitor 54 may be adjustable to provide an optimum input impedance for the selective amplifier 15. The RC input network 54–55 attenuates low frequency signals but readily passes higher frequency signals while the filter 52–53 and the negative feedback capacitor 54 will eliminate the very high radio frequency signals, whereby there exists an optimum range of frequencies which will be passed and amplified by the amplifier 15. FIGURE 3 indicates the response characteristic of the selective amplifier 15 as the input frequency varies from zero to a maximum. Because of the effect of the input RC circuit, the initial portion of the curve increases, approximately linearly from the origin. As the amplifier saturates, a maximum voltage output will be produced over a range of frequencies, and the amplifier will "roll off" and decrease in output response as the frequency continues to increase toward the radio frequency range of the oscillators 11 and 13. The output voltage level $E_1$ and $E_2$ correspond to the frequencies $F_1$ and $F_2$ and represent the switching levels of the presence detector circuit. As will be described subsequently, the output switching circuit will be first operated at the level $E_2$ to cause operation of a signal, traffic gate or other load device, and the load device will be restored to normal when the ouptut voltage level decreases to that indicated as $E_1$.

The output signal from the amplifier 15 will appear as an alternating current at a point 66. The detector circuit 16 comprises a voltage doubler arrangement including two diodes 67 and 68 and two capacitors 69 and 70. The diode 67 will initially conduct during one half cycle of the alternating wave appearing at a point 66 and will cause a charge to be stored on the capacitor 69. During the next half cycle of the wave, the diode 68 will conduct to store a final voltage level on the capacitor 70. The potential stored in the capacitor 70 corresponds with the amplitude of the alternating wave at the point 66. Because of the polarity of the diodes 67 and 68, the voltage stored at a point 71 will be negative in polarity when the frequency of the oscillators 11 and 15 becomes unequal and a beat frequency therebetween is detected and amplified.

The loop oscillation detector 19 comprises a transistor 73 having a base electrode coupled to the oscillator 11 by an RC network including a capacitor 74 and a resistor 75. A diode 76 is coupled between the base and the emitter electrodes of the transistor 73 to maintain an approximately zero bias thereto—the diode 76 providing a charging path for capacitor 74 for positive oscillator excursion. The emitter electrode of the transistor 73 is directly connected to the ground reference potential, and the collector electrode is coupled to the negative reference potential by a load resistor 77. The transistor 73 is normally overdriven by the oscillator 11 such that the output therefrom is a square wave limited in amplitude by the resistor 77 and as such will generate a wave which is constant in amplitude.

The constant amplitude wave from the collector electrode of the transistor 73 is rectified in a voltage doubler circuit including a first diode 78 and a second diode 79 together with a first capacitor 80 and a second capacitor 81. This voltage doubler circuit functions similarly to the circuit 16 except that the polarity of the diodes 78 and 79 are reversed from the polarity of the diodes 67 and 68, and therefore, the direct output potential appearing at a point 82 will be of positive polarity. Therefore, a positive voltage appearing at the point 82 indicates that the loop oscillator 11 is functioning properly, and the absence of such a voltage indicates a malfunction of the circuit and demands a fail safe switching action by the circuit 17.

The switching circuit 17 comprises a first pair of transistors 84 and 85 connected as a "Schmitt trigger" and further transistors 86, 87 and 88. The Schmitt trigger is initially biased by the positive voltage at the point 82 coupled to the base electrode of the transistor 84 by a resistor 89. The positive voltage from the point 82 may flow to ground via a network including the resistor 89, a further resistor 90 and the two diodes 67 and 68. However, if a negative potential appears at the point 71 from the detector circuit 16, this negative bias will be passed to the base electrode of the transistor 84 via the resistor 90 whereupon the transistor 84 may be rendered conductive. When the transistor 84 becomes conductive, current flows from the point of positive bias 82 through a resistor 91 to the emitter electrode of the transistor 84 and thence from the collector electrode thereof through a load resistor 92 to the negative reference potential. When current flows through the transistor 84, the potential at a common emitter electrode point 93 becomes less positive, whereupon the normally conducting transistor 85 is biased into non-conduction. The transistor 85 includes a base electrode coupled to the collector electrode of the transistor 84 by a resistor 94, and coupled to the ground reference potential by a resistor 95. The collector electrode of the transistor 85 is coupled to the negative reference potential by a resistor 96, and is directly coupled to the base electrode of the transistor 86. The transistor 86 constitutes an emitter follower with the collector electrode thereof directly connected to the point of negative reference potential and with the emitter electrode coupled to the positive potential of the point 82 by resistors 96 and 97.

The base electrode of the transistors 87 is coupled to the emitter follower 86 via the potential dividing network including the resistors 96 and 97. The transistor 87 includes an emitter electrode directly connected to ground potential and a collector electrode coupled to the negative reference potential by a load resistor 98. This transistor constitutes a switching amplifier, and it will be biased either at cut off or at saturation. The transistor 88 includes a base electrode directly coupled to the transistor 87, and an emitter electrode biased above ground potential by the forward voltage drop across a diode 99. The collector electrode of the transistor 88 is coupled to a load device such as a winding for a mechanical relay 100. The transistor 88 is normally is a state of conduction such that current flows through the winding 100, but when the oscillators 11 and 13 become unequal in frequency output such that a negative potential will appear at the point 71, then the transistor 88 will be biased into non-conduction with no current flow through the winding 100. Similarly, if the oscillator 11 malfunctions such that no positive bias appears at the point 82, the transistor 88 will be cut off and no current will flow through the winding 100. Thus, it may be appreciated that the winding 100 is arranged to be fail safe to normally conduct current, and non-conduction therein will cause the desired switching action. Obviously, a power failure would cause such non-conduction of current and would result in the desired switching action. A diode 101 is connected in shunt across the winding 100 and will provide a conductive path for voltage surges which may result when the transistor 88 is suddenly cut off and current flow in the inductive winding 100 is terminated.

FIGURE 4 shows an alternative form of a loop oscillator circuit which may be used as the oscillator 11 of FIGURE 1. This circuit includes a loop having a grounded center tap indicated as a winding 12'. The base electrode of a first transistor 103 is coupled to one terminal of the loop by a resistor 104. The emitter electrode of the transistor 103 is directly connected to ground reference potential, and the collector electrode thereof is connected to the negative reference potential by a load resistor 105. The base electrode of a second transistor 106 is directly connected to the collector electrode of the transistor 103. The transistor 106 is connected as an emitter follower with the collector electrode thereof directly connected to the negative reference potential and with the emitter electrode coupled to the other terminal of the loop 12' by a load resistor 107. A capacitor 108 together with the loop 12' constitutes a tuned circuit and provides a positive feedback path from the transistor 106 to the transistor 103. A resistor 109 provides a negative feedback path to stabilize the operation of the amplifier.

FIGURE 5 shows a push-pull type loop oscillator which has been found to be very stable in frequency. This oscillator uses a loop 12' having a center tap connection which is grounded. In this circuit resistors 111, 112, 113 and 114 comprise pairs of direct voltage dividers to bias the base electrodes of two transistors 115 and 116. A resistor 117 provides a common emitter circuit for the transistors 115 and 116. A resistor 118 and a capacitor 119 comprise and RC circuit for providing a positive feedback between the collector electrode of the transistor 116 and the base electrode of the transistor 115. Likewise, a resistor 120 and a capacitor 121 comprise an RC circuit to provide positive feedback from the collector electrode of the transistor 115 to the base electrode of the transistor 116. In both the circuits of FIGURES 4 and 5, a coupling resistor 123 will pass signal oscillations to the difference frequency or beat frequency detector 14 (FIGURE 1), and a coupling resistor 124 will pass the oscillations to the loop oscillation detector 19.

As indicated in FIGURE 3, the frequency and voltage levels at which the output switching circuit 17 is energized and is de-energized are substantially different from each other to provide a circuit which is partially self-sustaining. Thus, when the frequencies of the oscillators 11 and 13 begin to swing apart from each other, no switching action will occur until the level $E_2$ is reached. However, once operated the switch will remain so until the signal level decreases to the substantially lesser value of $E_1$. This intentional hysteresis or partial sustaining characteristic of the switching circuit results from a positive feedback path provided by a resistor 126 (FIGURE 2). The change of the conductive state of the Schmitt trigger including the transistors 84 and 85 is initiated by a negative bias of a sufficient level being passed from the point 71 by the resistor 90 to decrease the effect of the positive bias from the point 82 passed by the resistor 89. Once the conductive state is reversed, a further negative bias will be passed from the emitter electrode of the emitter follower 86 via the resistor 126 to the base electrode of the transistor 84. With the additional negative bias present from the resistor 126, a negative bias of a substantially decreased level from the resistor 90 will sustain the transistor switch in an operated condition. Thus, the resistor 126 provides a positive feedback that permits the circuit to partially sustain itself in the operated position. As indicated in FIGURE 2 the resistor 126 may be adjustable such that the holding range of the circuit may be adjusted to suit the conditions under which the presence detector is to operate.

In an exemplary embodiment of this invention, the reference oscillator 13 was designed to provide an output signal having a frequency of 90 kilocycles. Similarly, the normal frequency of the loop oscillator 11 was 90 kilocycles with no metal mass positioned in the field of the loop 12. When an automobile or similar object was driven over the loop of the oscillator 11, a frequency thereof could be expected to shift to 91 kilocycles or higher. In such an event, the difference frequency or beat frequency output from the circuit 14 passed by the amplifier 15 would be 1000 cycles or greater. Exemplary values of the frequencies and switching levels indicated in FIGURE 3 are as follows:

$F_1 = 500$ cycles
$F_2 = 1000$ cycles
$E_1 = 1$ volt
$E_2 = 2$ volts
$E_{max} = 3$ volts An alternative means for partially self-sustaining the circuit may be provided by a resistor 127 coupled between the oscillators 11 and 13. The resistor 127, if used, would provide a passive coupling between the oscillators and would tend to cause the oscillators to lock together in frequency output. Thus, if the oscillators 11 and 13 were tuned to oscillate a frequency nearly equal, the coupling effect of the resistor 127 would thence lock the oscillators together. However, if a vehicle passed within the field of the loop 12, the oscillator 11 would be de-tuned with respect to the reference oscillator 13 such that the two oscillators would function independently. On the other hand, if the vehicle moved away from the loop 12, the oscillator frequencies would again become nearly equal and with the coupling provided by the resistor 127 they would again lock together. Obviously, the resistor 127 may be variable such that the degree of coupling between the oscillators may be adjusted for adjusting the switching range of the presence detector.

The foregoing paragraph indicates an intentional coupling between the oscillators 11 and 13. In a normal installation, an inadvertent coupling exists due merely to the proximity of the oscillating circuits and components thereof, and due further to the fact that the two circuits may share a common power supply which provides the negative reference potential, —E. Thus, even though no intentional coupling may be provided between the two oscillators, nevertheless, coupling may exist inadvertently. Such a coupling is not undesirable but would merely add in the partial self-sustaining characteristic of this circuit.

Since the circuits of the oscillators 11 and 13 are similar to each other, a passive coupling therebetween will make each oscillator somewhat affected by the frequency of the other. Therefore, if the two circuits 11 and 13 would independently oscillate at slightly different frequencies, the result obtained by the coupling therebetween would be to change the frequencies of both oscillators to some new frequency intermediate between the individual frequencies. Thus, it may be appreciated that the frequency of the reference oscillator 13 may not have a fixed and unchangeable value, but may be influenced by the oscillator 11 which is understood to swing in the frequency of its output signal.

FIGURE 6 illustrates the manner in which the circuits of this invention may be used to operate a device such as a one-way vehicular gate. Such a gate may permit automobiles or other vehicles to exist from a paid parking lot or the like, but which will not permit any vehicles to enter therethrough. The inductive loop 12 may be embedded in the paving of a traffic lane generally outlined by the dashed lines 129. Automobiles may be expected to follow the traffic lane in the direction of the arrows 130 generally proceeding from left to right as shown in FIGURE 6. The inductive loop 12 may be wide enough to extend substantially across the traffic lane and may be approximately the same length as an automobile. A gate 131 is mechanically coupled to and opened by an actuation device 132 controlled by a presence detector 133 which generally includes all of the circuitry discussed heretofore.

As shown in FIGURE 6, the inductive loop is not symmetrically placed with respect to the gate 131 but is positioned to provide a relatively large area or field region 134 on the approach side of the gate and a comparatively smaller area or field region 135 on the exit side thereof. As the vehicle moves into the area 134, the frequency of the loop oscillator increases, but the switching level for operating the gate 131 will not be reached until a substantial portion of the automobile actually moves over the area 134 of the loop. After the switching operation, the presence detector circuit 133 becomes partially self-sustaining as discussed heretofore whereupon a much lesser area of the loop 12 need be covered by the metal mass of the vehicle. The vehicle may move along the traffic lane 129 past the open gate 131 and off the loop to the right side thereof as shown in FIGURE 6. Since the circuit is partially self-sustaining, a comparatively smaller area of the vehicle within the region 135 will maintain the gate in the open position. After the vehicle has departed from the loop, the gate 131 will re-close and may not be again opened except by the approach of another vehicle over the region 134. Obviously, no vehicle can open the gate by approaching in the wrong direction (from the right as shown in FIGURE 6), since the region 135 is not sufficiently large to permit a metal mass of sufficient size to enter therein to initially operate the switching circuits of the presence detector, although the region 135 is sufficiently large for an automobile to sustain the circuits and hold the gate open. Therefore, the traffic gate shown by FIGURE 6 may be operated only by vehicles approaching from the left, but once operated the gate will remain open until the vehicle has cleared the gate from the right.

FIGURE 7 illustrates an arrangement for using the presence detector circuits of this invention for operation of railroad signals or crossing gates. In this case, the inductive loop 12 is positioned between the rails 137 of the railroad track. Operation of the presence detector circuit may be considered somewhat similar to that as shown in connection with FIGURE 6 but with an important modification. As the trucks of a railroad car pass along the rails 137 over the magnetic field of the loop 12, electrically conductive paths are formed between the rails by the wheels and axles of the trucks. When the first axle passes substantially over the loop and the second axle continues to approach, a short circuited electrically conductive loop magnetically coupled with the loop 12 comes into existence. Two opposed spaced sides of the loop are formed by the rails 137 while the other two opposed spaced sides are formed by the wheels and axles 138 of the railroad car or truck thereof. The loop 12 effectively becomes a primary winding of a transformer having a short-circuited secondary winding, and the inductance thereof decreases radically in value. After the truck of a railroad car has passed over the loop, the magnetic coupling therefrom will be decreased somewhat, since the body of the car is supported higher above the loop then was the mass of the truck. Using the partial sustaining means of this invention the presence detector would be operated by the first truck of the railroad car and would remain operated by the lesser inductive effect of the body of the car and the more remote location of the wheels and axles.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. Apparatus for sensing the presence of a metallic mass, said apparatus comprising a first oscillator including an inductive loop, said loop being operable to vary in inductance value when a metallic mass enters the field thereof to vary the frequency of the first oscillator from a normal value, a second oscillator for generating a reference frequency substantially equal to the normal frequency of the first oscillator with no metallic mass in the field of the loop, a beat frequency detector coupled to both oscillators and operable to generate a beat frequency signal when the frequency of the first oscillator varies from the normal frequency, rectifying means coupled to the beat frequency detector for generating a direct voltage when the frequency of the first oscillator varies from the normal value, and an output switching means coupled to the rectifying means, said switching means including a positive feedback path to render the switching means partially self-sustaining.

2. Apparatus for sensing the presence of a metallic mass, said apparatus comprising a first oscillator including an inductive loop, said loop being operable to vary in inductance value when a metallic mass enters the field thereof to vary the frequency of the first oscillator from a normal value thereof, a second oscillator for generating a reference frequency which is equal to the normal frequency of the first oscillator with no metallic mass in the field of the loop, a beat frequency detector coupled to both oscillators and operable to generate a beat frequency when the frequency of the first oscillator varies from the normal frequency, a first rectifying means coupled to the beat frequency detector and operable to generate a direct voltage when the frequency of the first oscillator varies from the normal value, a second rectifying means coupled to the first oscillator and operable to generate a direct voltage therefrom, and an output switching means coupled to both rectifying means, said switching means being operable to effectively close when a direct voltage appears from the first rectifying means and being further operable to close when no direct voltage appears from the second rectifying means, said switching means including a positive feedback path to render the switching means partially self-sustaining.

3. Apparatus for sensing the presence of a vehicle, said apparatus comprising a first oscillator including an inductive loop embedded in a traffic lane and operable to generate a magnetic field in a particular region over the traffic lane, said loop being further operable to vary in inductance value when a vehicle moves into the field of the loop whereby the frequency of the first oscillator is shifted from a normal value thereof, a second oscillator for generating a reference frequency equal to the normal value of the frequency of the first oscillator, a beat frequency detector coupled to both oscillators and operable to generate a beat frequency signal when the frequency of the first oscillator varies from the normal frequency, rectifying means coupled to the beat frequency detector for generating a direct voltage when the frequency of the first oscillator varies the normal value, and an output switching means coupled to the rectifying means, said switching means including a positive feedback path to render the switching means partially self-sustaining.

4. The apparatus in accordance with claim 3 further comprising an inductive loop arrangement for operation of a gate to control movement of vehicles, said inductive loop being embedded in the paving of a traffic lane and having a relatively large area extending on one side of the gate and a relatively small area extending on the other side thereof, said loop being operable to shift the frequency of the first oscillator and to cause operation of the switching means when a vehicle moves into the field of the loop over the large area thereof and being further operable to sustain the switching means when the vehicle moves over the small area of the loop.

5. Apparatus for sensing the presence of a vehicle on a railroad track, said apparatus comprising a first oscillator including an inductive loop which is positioned between the rails of a railroad track, said loop being operable to vary in inductance when a metallic mass enters the field thereof and when wheels and axles of the vehicles effectively create a shorted turn magnetically coupled with the loop, said first oscillator being operable to shift in frequency from a normal value thereof, a second oscillator for generating a reference frequency equal to the normal frequency of the first oscillator with no metallic mass in the field of the loop, a beat frequency detector coupled to both oscillators and operable to generate a beat frequency signal when the frequency of the first oscillator varies from the normal frequency, rectifying means coupled to the beat frequency detector for generating a direct voltage when the frequency of the first oscillator varies the normal value, and an output switching means coupled to the rectifying means, said switching means including a positive feedback path to render the switching means partially self-sustaining.

6. Apparatus for sensing the presence of a metallic mass, said apparatus comprising two oscillators having similar circuits and normally operable to generate signals of the same frequency, a first of the oscillators including an inductive loop operable to vary in inductance value when a metallic mass enters the field thereof whereby the signal from the first oscillator will vary in frequency, a beat frequency detector coupled to both oscillators for generating a signal having a frequency which is equal to the difference of the frequencies of the oscillators, frequency selective means coupled to the beat frequency detector for generating an output signal corresponding to the value of the beat frequency, detecting means coupled to the first oscillator for sensing the presence of a signal therefrom, output switching means coupled to the frequency selective means and to the detecting means for providing an output indication when the beat frequency detector varies from a normal state and when the loop oscillator fails to generate a signal, and means coupling between the two oscillators for normally synchronizing the oscillators with each other.

7. A presence detector for indicating the presence of a metallic mass within a predetermined area, comprising, in combination: a first electronic oscillator circuit including at least one frequency determining resonant circuit, a portion of which consists of an inductive loop; means positioning said loop in said predetermined area; said loop being responsive to the presence of a metallic mass in said predetermined area to vary the resonant frequency of said circuit and thereby vary the frequency of said first electronic oscillator; a second electronic oscillator providing a reference frequency; a difference frequency detector; means coupling said difference frequency detector to the output of said first and second electronic oscillators to provide a further output signal having a frequency determined by the difference in frequency of said first and second oscillators; a frequency selective amplifier normally rejecting the difference frequency provided by said first and second oscillators but passing the difference frequency provided by said first and second oscillators when the frequency of said first oscillator is varied by said loop; a first detector; means coupling said first detector to said first oscillator to provide a direct voltage of a first polarity; a second detector; means coupling said second detector to the output of said frequency selective amplifier to provide a direct voltage of a second polarity when said amplifier passes said difference frequency; switching means; means coupling said switching means to the output of said first and second detectors to provide an output signal either in response to the absence of said direct voltage of a first polarity or the presence of said direct voltage of a second polarity in excess of a predetermined threshold; and means coupling a portion of said output signal to the input of said switching means to decrease said predetermined threshold.

8. The presence detector of claim 7 wherein said predetermined threshold is —2 volts and said last named means decreases said threshold to —1 volt.

9. The presence detector of claim 7 wherein said predetermined threshold is +2 volts and said last named means decreases said threshold to +1 volt.

10. The presence detector of claim 7 wherein the frequencies of said first and second oscillators are normally equal when the frequency of said first oscillator is not varied by said loop.

11. Apparatus for sensing the presence of a vehicle, comprising, in combination: a first oscillator circuit including a frequency determining loop; means fixedly positioning said loop in spaced relation to a path for vehicles; said frequency determining loop exhibiting a normal value of inductance which varies when a vehicle moves near or into the area defined by said loop thereby varying the frequency of oscillation generated by said circuit; a reference frequency oscillator circuit for generating a frequency substantially the same as the frequency generated by said first oscillator circuit when said loop exhibits said normal value of inductance; means applying the frequencies generated by said first and said reference frequency oscillators to a mixer, said mixer providing a frequency equal to the difference in frequency between said generated oscillation frequencies; a band-pass amplifier coupled to said mixer and operable to pass said difference frequency only when the oscillation frequency of said first oscillator circuit is varied by said loop; detector means coupled to said band-pass amplifier operable to provide a direct voltage of a first polarity in response to said difference frequency passed by said band-pass amplifier; switch means coupled to said detector means for providing an output signal when said direct voltage of a first polarity exceeds a predetermined threshold; and means coupling a portion of said output signal to the input of said switch means tending to decrease said pretetermined threshold.

12. The apparatus of claim 11 including further detector means coupled to said first oscillator circuit operable to provide a direct voltage of a second polarity; means coupling said direct voltage of a second polarity to said switch means; and said switch means additionally operable to provide said output signal in the absence of said direct voltage of a second polarity.

References Cited by the Examiner

UNITED STATES PATENTS

| | | | |
|---|---|---|---|
| 2,105,930 | 1/38 | Reichard | 246—249 |
| 2,355,395 | 8/44 | Rubenstein. | |
| 2,390,221 | 12/45 | Lindsay et al. | 340—258 X |
| 2,421,771 | 6/47 | Browning | 340—258 |
| 2,454,687 | 11/48 | Baughman | 246—122 X |
| 2,646,559 | 7/53 | Nutzler | 340—258 |
| 2,652,551 | 9/53 | Gumpertz et al. | 340—258 X |
| 2,670,434 | 2/54 | Groenendale | 246—63 X |
| 2,704,339 | 3/55 | Westcott. | |
| 2,917,732 | 12/59 | Chase et al. | 340—258 |
| 2,943,306 | 6/60 | Gray et al. | 340—258 |
| 3,164,802 | 1/65 | Kleist et al. | 246—63 X |

FOREIGN PATENTS

| | | |
|---|---|---|
| 222,369 | 10/24 | Great Britain. |
| 656,366 | 8/51 | Great Britain. |
| 719,179 | 11/54 | Great Britain. |
| 1,203,211 | 7/59 | France. |

OTHER REFERENCES

Radio Amateur Handbook, 1945 ed. published by American Radio Relay League.

EUGENE G. BOTZ, *Primary Examiner*.

JAMES S. SHANK, LEO QUACKENBUSH, *Examiners*.